United States Patent [19]

Botz et al.

[11] 4,327,264
[45] Apr. 27, 1982

[54] FASTENING DEVICE FOR A SWITCH

[75] Inventors: Jakob Botz, Ingersheim; Rolf Feger, Bietigheim-Bissingen; Erich Mutschler, Bietigheim-Bissingen; Hubert Spazierer, Bietigheim-Bissingen; Adam Weber, Bietigheim-Bissingen, all of Fed. Rep. of Germany

[73] Assignee: ITT Industries, Inc., New York, N.Y.

[21] Appl. No.: 126,327

[22] Filed: Mar. 3, 1980

Related U.S. Application Data

[63] Continuation of Ser. No. 898,767, Apr. 21, 1978, abandoned.

[30] Foreign Application Priority Data

Apr. 29, 1977 [DE] Fed. Rep. of Germany ....... 2719194
Dec. 31, 1977 [DE] Fed. Rep. of Germany ....... 2759182

[51] Int. Cl.³ .......................... H01H 9/08; G12B 9/00
[52] U.S. Cl. ................................ 200/295; 200/61.54; 200/296; 200/297; 248/273
[58] Field of Search .................... 200/61.54–61.57, 200/295, 296, 297; 248/27.3, 27.1; 24/230 R

[56] References Cited

U.S. PATENT DOCUMENTS

| 2,532,840 | 10/1950 | Bauer | 200/295 X |
|---|---|---|---|
| 3,168,612 | 2/1965 | Sorenson | 248/27.3 X |
| 3,180,595 | 4/1965 | Brunsting et al. | 248/27.3 |
| 3,308,260 | 3/1967 | Krieger et al. | 200/295 |
| 3,311,731 | 3/1967 | Koepe | 200/295 |
| 3,681,593 | 8/1972 | Lenovese et al. | 248/27.3 X |
| 3,793,491 | 2/1974 | Cryer | 200/61.54 X |
| 3,866,868 | 2/1975 | Fish et al. | 248/27.3 |
| 3,947,932 | 4/1976 | Flynn | 24/230 R |
| 4,006,872 | 2/1977 | Tanner | 248/27.1 |
| 4,080,522 | 3/1978 | Schimmels | 248/27.3 |

FOREIGN PATENT DOCUMENTS

| 1665859 | 11/1971 | Fed. Rep. of Germany | 200/61.54 |
|---|---|---|---|
| 2513050 | 10/1976 | Fed. Rep. of Germany | 200/61.54 |
| 5776658 | 5/1958 | Italy | 200/296 |
| 1308615 | 2/1973 | United Kingdom | 200/295 |

Primary Examiner—Stuart S. Levy
Attorney, Agent, or Firm—James B. Raden; Donald J. Lenkszus

[57] ABSTRACT

A fastening device which permits snap-in assembly of a switch to a panel or receiving member includes a resilient latching member connected to the switch housing and adapted to engage a shoulder of the receiving member. A second resilient member serves to urge the resilient latching member into contact with the shoulder. In one embodiment of the invention, the switch housing is inserted into a receiving portion of a control panel and a connector carries at least one resilient latching member adapted to engage a shoulder on the receiving portion. In this embodiment, the connector and panel cooperate to retain the switch.

3 Claims, 8 Drawing Figures

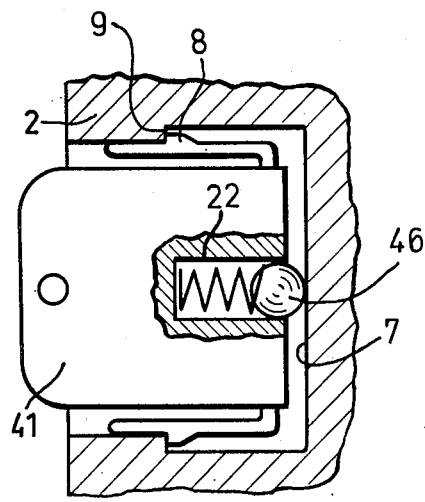
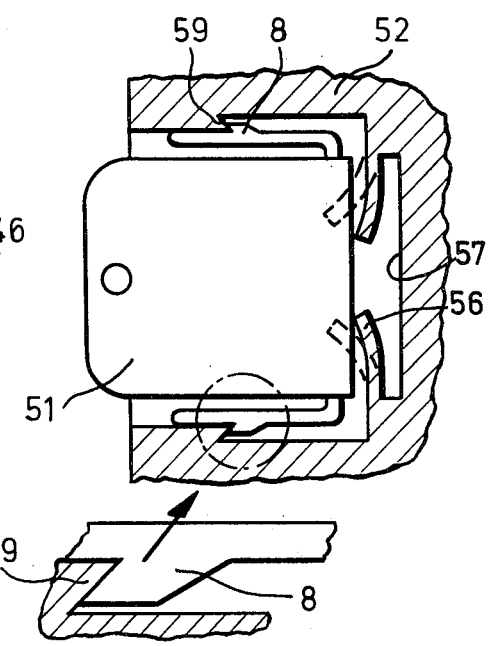
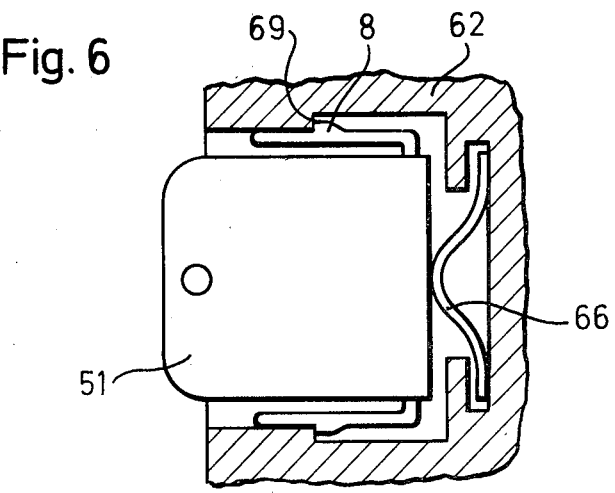

FASTENING DEVICE FOR A SWITCH

This is a continuation of application Ser. No. 898,767, filed Apr. 21, 1978, now abandoned.

BACKGROUND OF THE INVENTION

The invention pertains to fastening devices in general and to a fastening device for mounting an electrical switch in particular.

In mass production, it is desirable to use as few screws as possible to manufacture an assembly including small switches. Nonlocking switches, such as automotive steering column switches, are typically mounted on a receiving member via locking or clamping connections. This receiving member may be an instrument panel, a housing embracing the individual switches or a mounting plate.

In German Pat. No. 1,665,859, an electric tumbler switch is secured to an instrument panel by means of resilient holding elements formed on a housing portion. In this design a precise installation position cannot be guaranteed because of manufacturing tolerances. Furthermore the switch is not easily removable from the housing and therefore the instrument panel may be inadvertently scratched when removing the switch.

It is one object of the invention to create a fastening device for switches of all types which on the one hand guarantees an exactly defined installation position with given tolerances and without play and on the other hand makes possible simplified assembly and disassembly.

SUMMARY OF THE INVENTION

In accordance with the principles of the invention, a fastening device for a switch or other component includes at least one resilient holding element and at least one resilient second element. The resilient holding element is adapted to engage a shoulder on a limiting surface of a receiving member. The spring force of the resilient locking member urges the resilient locking member against limiting surface of the receiving member such that the movement of the switch or component is limited by the shoulder. The resilient second element provides a spring force against the housing member in a direction such that the switch or component is urged against the shoulder.

By this design, it is possible to secure a switch in the receiving member very exactly with standard manufacturing tolerances and without play. The switch is always fixedly pressed against the locking shoulder in the receiving member. Clearance between the switch and receiving member is thereby eliminated. Further, the danger of damaging the switch during disassembly is reduced. It is only necessary to release the locking device of the holding element by pressing the switch against the resilient second element, whereafter it can very easily be unlocked from outside. The spring action of the second element then presses the switch out of the receiving member so that it can be seized without a tool.

DESCRIPTION OF THE DRAWINGS

Other features of the invention and the manner of obtaining them will become more apparent, and the invention will be best understood by reference to the following description taken in conjunction with the accompanying drawings in which:

FIGS. 4 to 7 are further alternate embodiments of a fastening device in accordance with the invention.

In FIG. 1 a steering column switch 1 is pushed into a receiving member 2 which is secured to the steering tube 3. A resilient holding element 5 and a tensioned element 6 are formed on the housing 4 of the switch 1. the element 6 presses against a back wall 7 of the receiving member 2. The holding element 5 includes a locking lug 8 which locks behing a shoulder 9 of a limiting wall 10 of the receiving member 2. The locking lug 8 is extended to a release key 11 provided with an inclined portion 12 and is accessible from outside the housing via an opening 13. In the area of the locking lug 11, the receiving member is provided with an aperture 14. The untensioned position of the holding element and of element 6 is shown in the drawing by dash-dotted lines. The arrows 15 and 16 indicate the direction of the restoring or spring forces of the elements 5 and 6. Due to the cooperation of the spring forces 15 and 16, the switch 1 is pressed away from the back wall 7 such that the locking lug 8 comes to rest in a defined position on the shoulder 9.

Figure 1:
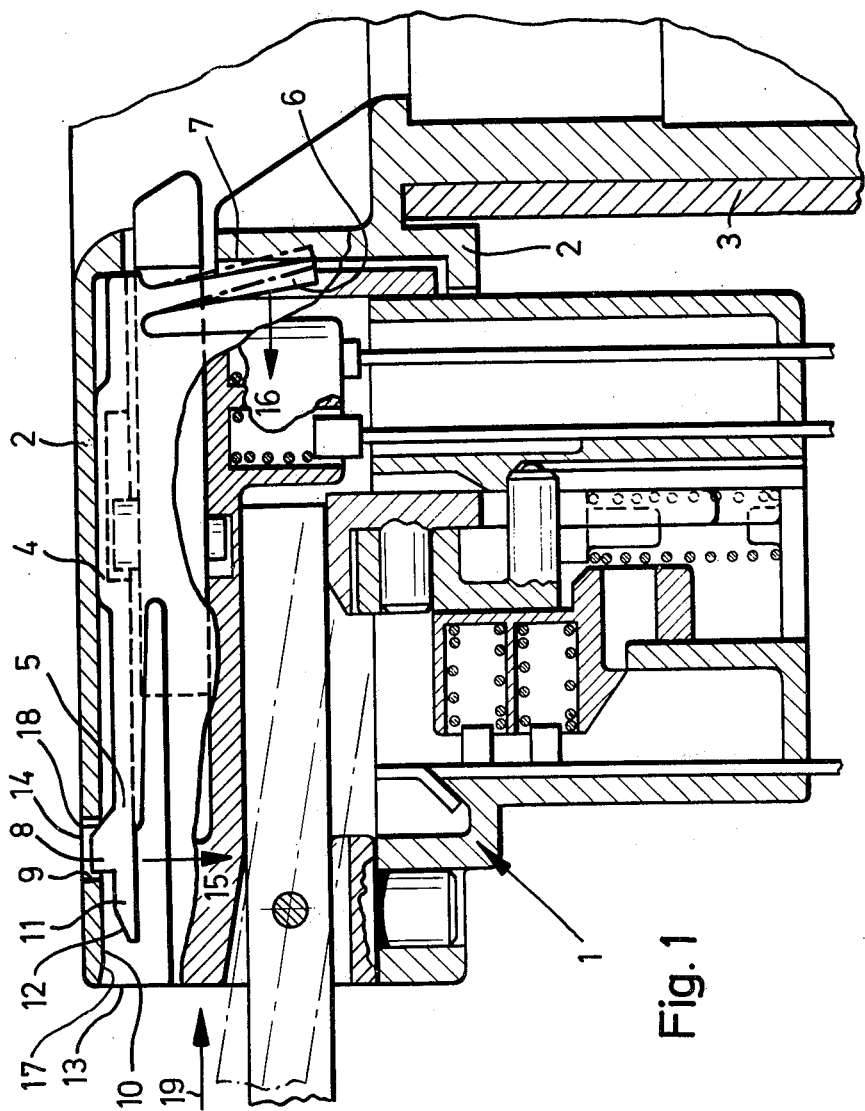
FIG. 1 illustrates in cross-section a direction indication control switch secured to a receiving member fixed on an automotive steering column.

To facilitate the assembly, the opening 13 of the receiving member 2 is provided with an inclined portion 17 and the holding element 5 includes the inclined surface 18.

For disassembly, the switch 1 is pressed in the direction 19 against the spring force of the element 6; the holding element 5 is pressed downwards by a tool through the aperture 14 or via the release key 11. The force 16 then presses the switch 1 slightly out of the receiving member so that the switch 1 can be manually seized without difficulties.

Figure 2:
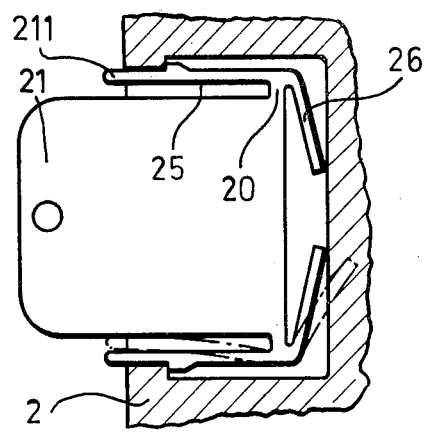
FIG. 2 is a partial cross-section view of a fastening device for a switch in which a holding element and a resilient second element are integrally interconnected.

In the fastening device according to FIG. 2, the holding element 25 and the element 26 are designed in one piece; they are connected to the switch 21 by a movable web 20. The receiving member can be identical with the receiving member according to FIG. 1 and therefore is also designated by the reference numeral 2. The web 20 has a spring characteristic substantially softer than the riblike connection between the holding element 25 and the element 26. From a theoretical point of view, the holding element 25 thereby could be made absolutely rigid. However, to provide a reliable compensation for play, it is desirable that the holding element 25 have a slight resiliency. Whereas, the holding element 25 and element 26 are shown in an inserted or tensioned condition, the rest or untensioned position of the elements 25 and 26 are shown by dash-dotted lines in the lower portion of FIG. 2.

It is apparent that the switch 21 is simply inserted into the receiving member 2. A holding effect of the holding element 25 only appears after the element 26 has reached the back wall 7 of the receiving member 2. Disassembly is affected via the projecting release key 211. Of course, a release via an aperture in the receiving member 2 would also be possible.

Figure 3:
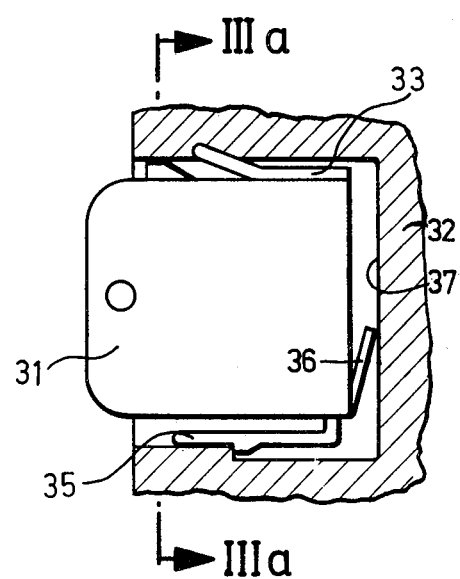
FIG. 3 is a fastening device with an additional guide member.
Figure 3A:
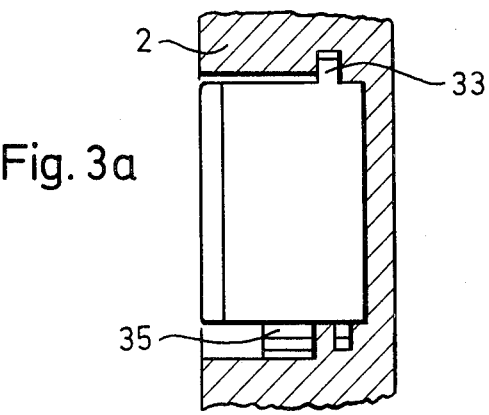
FIG. 3a is a section of the device of FIG. 3 taken on the line IIIa—IIIa.

In the embodiment according to FIGS. 3 and 3a, a holding element is provided on a switch housing 31. On the back of holding element 35 there is an element 36 for an additional lateral compensation for play as well as a guide web 33 for guidance.

In the embodiment according to FIG. 4, a switch housing 41 includes a guide base 22 adapted to receive a spring-loaded compression member 46. The member 46 engages back wall 7 of the receiving member 2 and presses the switch housing such that a locking lug 8 engages a shoulder 9.

In the embodiment according to FIG. 5, the locking lugs 8 of switch housing 51 is pressed against the inclined shoulder 59 by means of two resilient webs 56 being formed on the back wall 57 of the receiving member 52. The position of the webs 56 in unloaded condition is shown in the drawing by dotted lines.

In the embodiment according to FIG. 6, a leaf spring 66 in the housing 62 urges the switch housing 51 outward until a locking lug 8 is pressed against the shoulder 69 of the receiving member 62.

Figure 7:
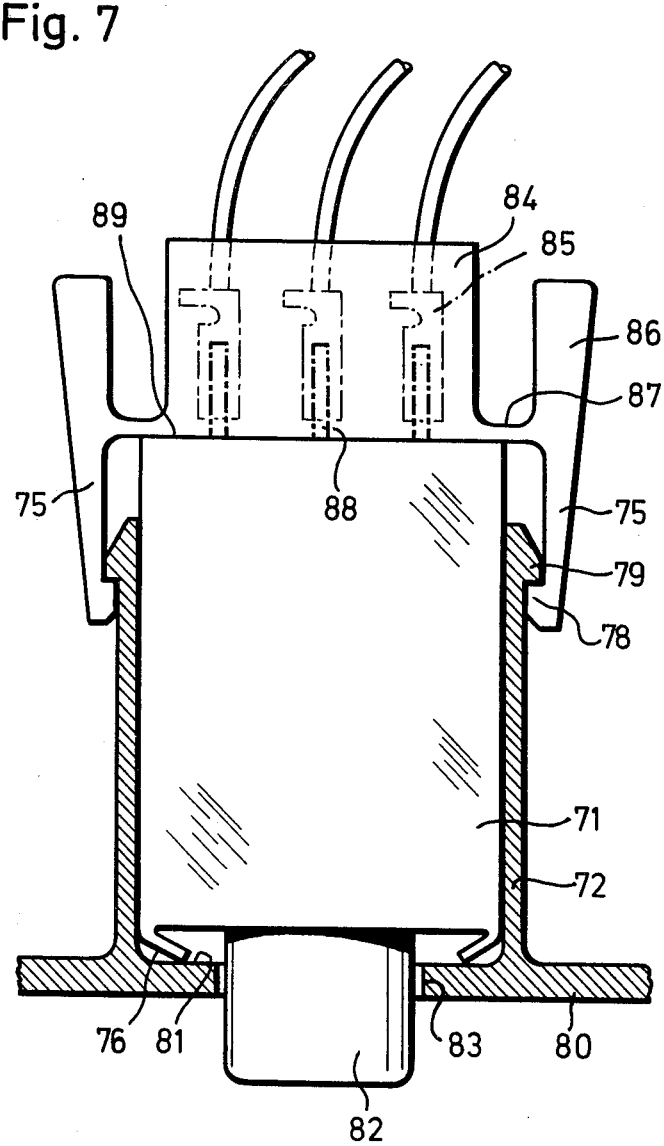

Finally, FIG. 7 illustrates an advantageous embodiment. A switch 71 is pushed into a receiving member 72 which, for instance, is formed on an instrument panel 80. The switch 71 includes resilient elements 76 which engage the back wall 81 of the receiving member 72. The switch includes an acutating key 82 which penetrates the back wall 81 via an opening 83.

A connector 84 comprising blade receptacles 85 is laterally provided with holding elements 75. The holding elements include locking lugs 78 which lock behind shoulders 79 of the receiving member 72. The holding elements 75 are connected with a release key 86 and via a movable web 87 with the actual connector 84.

The blade terminals extending out of the switch back wall 89 are designated by 88.

What is claimed is:

1. A fastening device for a switch housing comprising:
    a receiving member comprising a cavity adapted to receive said switch housing, said cavity having a side wall forming a limiting surface for limiting lateral movement of said switch housing, and a rear wall perpendicular to said side wall, said side wall having a shoulder;
    at least one resilient holding element, said resilient holding element including a portion adapted to engage said shoulder said resilient holding element urging said portion in a first direction into engagement with said shoulder;
    means for connecting said resilient holding element to said switch housing; and
    at least one resilient second element disposed between said switch housing and said rear wall for urging said housing away from said rear wall and thereby for urging said portion in a second direction into engagement with said shoulder, said second direction being substantially perpendicular to said first direction, wherein said resilient second element is integrally connected with said resilient holding element and said connecting means comprises a movable web connecting said resilient second element and said switch housing.

2. A fastening device according to claim 1, wherein said receiving member includes an opening for actuating said resilient holding element from outside said receiving member.

3. A fastening device according to claim 1, further comprising a release key connected to said resilient holding element.

* * * * *